455-611 AU 233 EX

FIP8106 XR 3,433,960

March 18, 1969 P. O. MINOTT 3,433,960

RETRODIRECTIVE OPTICAL SYSTEM

Filed Oct. 31, 1966

INVENTOR
Peter O. Minott

BY

ATTORNEYS

March 18, 1969 P. O. MINOTT 3,433,960

RETRODIRECTIVE OPTICAL SYSTEM

Filed Oct. 31, 1966 Sheet 2 of 3

INVENTOR
Peter O. Minott

BY

ATTORNEYS

INVENTOR
Peter O. Minott

BY

Q. F. McCay
ATTORNEYS

United States Patent Office 3,433,960

Patented Mar. 18, 1969

3,433,960

RETRODIRECTIVE OPTICAL SYSTEM

Peter O. Minott, Greenbelt, Md., assignor to the United States of America as represented by the Administrator of the National Aeronautics and Space Administration Filed Oct. 31, 1966, Ser. No. 591,007

U.S. Cl. 250—199 8 Claims

Int. Cl. H04b 9/00

ABSTRACT OF THE DISCLOSURE

An optical communication system employing a remote retrodirective reflector modulator, which modulator is responsive to a remote information source wherein the modulater is a modified interferometer of the Fabrey-Perot type having non-planar surfaces.

This invention relates to a communications system and more particularly to a communications system in which an information carrying beam of light transmitted from a point on earth is relayed by a satellite to another point on earth.

The continuous wave (CW) laser has stimulated widespread interest in the use of optical communications systems for space communications. Because of the relatively short wavelength of light, laser communication systems can achieve higher transmission efficiencies than microwave systems. Another attractive feature of laser communication systems is that laser communication components are smaller than their microwave counterparts. This latter feature is particularly important in space applications where weight and size considerations are critical.

However, several problems arise in the design and construction of optical communications systems for use in space. The selection of a synchronous orbit satellite to carry an optical relay station, following the lead of the earlier space communications systems using microwave frequencies, makes it necessary to use lasers which can effectively transmit a beam of light over greater distances than usually experienced for terrestrial communications. Another problem especially prominent in space communication systems is that of keeping the low reliability components of the system on the ground where maintenance is possible.

It is therefore an object of the present invention to provide a reliable and efficient optical communications system.

Another object of the invention is the provision of an optical communications system having a minimal power consumption for use as a synchronous orbit relay station.

It is another object of the present invention to provide a rugged and efficient optical communications system including a retrodirective optical modulator.

Another object of the present invention is to provide an optical communications system having a simple and efficient interferometer modulator for impressing an information signal on a light beam.

A further object of the invention is to provide a retrodirective modulator having a predetermined magnification factor of controlled area over controlling area.

These and further objects of the invention are obtained by the provision of a communications system having two active stations on earth and a semi-passive orbiting relay station. The semi-passive relay station includes a retrodirective optical modulator capable of receiving, modulating, and reflecting a light beam in a direction opposite to its initial direction while using a minimal amount of energy. The modulation is accomplished by a modified Fabry-Perot interferometer, operable to impress modulations on a light beam by creating destructive interference within the beam.

The various objects, as well as the features and attending advantages of the present invention will be more fully appreciated from the following detailed description, considered in conjunction with the accompanying drawings, in which.

Figures 1, 2:
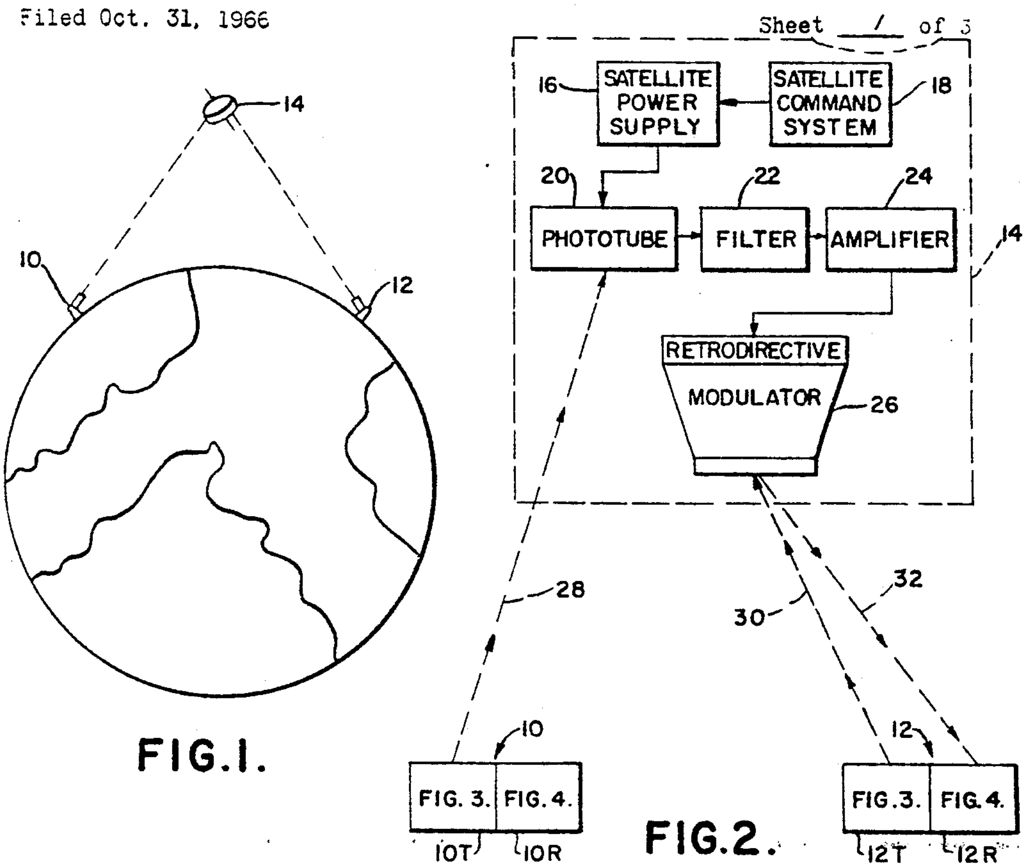
FIGURE 1 illustrates the active and passive stations of the optical communications system of the present invention.
FIGURE 2 is a diagrammatic view of the passive orbiting relay station of the system illustrated in FIGURE 1.

Referring now to FIGURE 1, there is shown a laser communications system including ground stations 10 and 12 and an orbiting relay station 14. Illustratively, but not limited thereto, relay station 14 is carried by a gravity gradient stabilized satellite in synchronous orbit such that it remains stationary relative to the ground stations. Each ground stations can be separated by distances up to optical receiver mounted on a precision tracking mount. For a synchronous orbit relay station as illustrated, the ground stations can be separated by distances up to 10,000 miles. Information can be transmitted from either ground station to the other via the relay station.

A block diagram of relay station 14 is shown in FIGURE 2. The power requirements of the relay station and the control functions are supplied by the satellite power supply 16 and command system 18 respectively. Power supply 16 may include a conventional arrangement of solar cells and batteries. Command system 18 includes telemetry receivers and switches for controlling the periods of operation of the relay station. A phototube 20 is provided to detect laser beams transmitted from either ground station. A Model 641A–03–18 ASCOP Multiplier Phototube manufactured by Electromechanical Research, Inc. of Princeton, New Jersey, used in combination with an optical collector, has been found to work satisfactorily. The signal detected by phototube 20 is filtered by post detection filter 22 and applied to drive amplifier 24. Any conventional filter having a bandwidth extending over the band of detected information may be utilized. Drive amplifier 24 is used to amplify the signal from filter 22 to a level sufficient to drive a retrodirective modulator 26. Modulator 26, to be subsequently described in greater detail, is an electromechanical optical modulator which is capable of modulating a laser beam received from the ground with the signal detected by phototube 20, and reflecting or retrodirecting the modulated beam back to the point of transmission.

Figure 3:
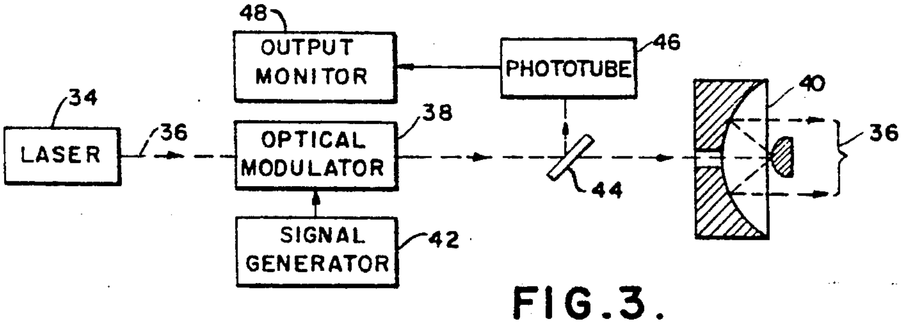
FIGURE 3 is a diagrammatic view of the laser transmitter of the active stations of the system illustrated in FIGURE 1.
Figure 4:
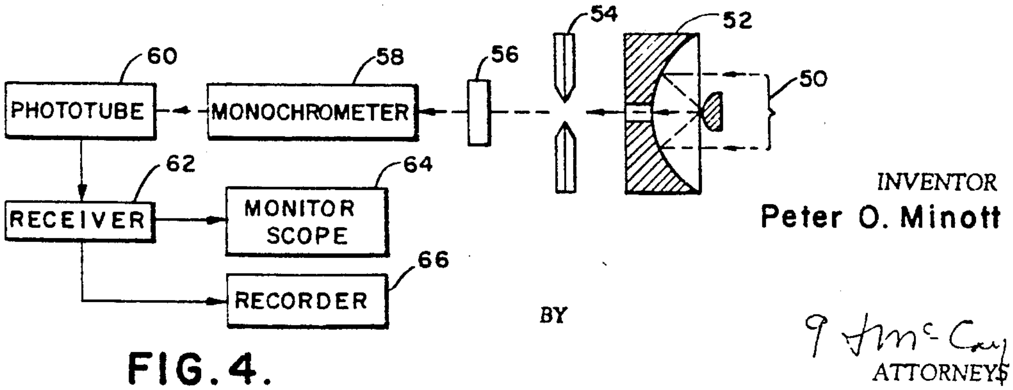
FIGURE 4 is a diagrammatic view of the optical receiver of the active stations of the system illustrated in FIGURE 1.

As shown in FIGURE 2, each ground station 10 and 12 has a laser transmitter 10T and 12T respectively, illustrated in more detail by FIGURE 3, and an optical receiver 10R and 12R respectively, illustrated in more detail by FIGURE 4. The laser transmitter of FIGURE 3 comprises laser 34 generating a laser beam 36. A typical laser suitable for use in the transmitter is the Model 3430 argon laser manufactured by the H/Nu Corporation of Los Angeles, California. The output of laser 34, illustrated as laser beam 36, is directed through an optical modulator 38 to a Cassegrainian reflective mirror or telescope 40. While numerous methods for modulation of laser beams are available, including the use of Kerr cells and Pockels cells, a Sears-Debye effect modulator has been found to be especially efficient. The Sears-Debye effect modulator utilizes acoustic waves to change the refractive index of a medium through which the laser beam is directed. A discussion of this type of optical modulator may be found in "Fundamentals of Optics" by Jenkins and White.

Modulator 38 is driven by a signal generator 42. In order to monitor the output of modulator 38, a beam splitter 44 is placed in the path of laser beam 36 to reflect a portion of the modulated beam to a phototube 46. Beam splitter 44 is typically a lightly silvered mirror with a 10% reflectivity. The output of phototube 46 is applied to an output monitor 48, such as a cathode ray oscilloscope or other suitable monitoring means. When a ground station is receiving information from relay station 14, the transmitter of FIGURE 3 can be operated to transmit an unmodulated laser beam by turning off modulator 38. Laser beam 36 will then be transmitted unmodulated from telescope 40 to relay station 14.

The optical receiver at ground stations 10 and 12 is illustrated in FIGURE 4. A telescope 52 is provided to receive a laser beam 50 which has been modulated in accordance with an information signal. After reception by telescope 52, laser beam 50 is directed through field stop 54, polarizer 56, and monochrometer 58 to phototube 60. Field stop 54 is a mask designed to block noise in the form of extraneous light. Polarizer 56 is placed in the path of beam 50 to pass only a laser beam having the same polarization as the laser beam transmitted from the ground station. Since the background light is randomly polarized, one-half of the background light will be eliminated by polarizer 56. Monochrometer 58 is an optical filter designed to have 1 A. or less passband at the frequencies generated by the ground station laser transmitter. Phototube 60 is operable to remove the information signal from the modulated laser beam. The output of phototube 60 is fed to a receiver 62 which demodulates the information signal and provides a representation of it to a monitor scope 64 and a recorder 66.

Referring to FIGURES 1 and 2, the operation of the overall system will be described. Station 10 has been shown as the transmitting station and station 12 as the receiving station. Laser beam 28, generated at station 10, is modulated in accordance with an information signal and directed toward the orbiting relay station 14. Simultaneously, a laser beam 30 is generated at station 12 and directed toward relay station 14. The modulator of station 12 is turned off during transmission so that beam 30 is transmitted unmodulated. Phototube 20 detects the signal impressed on laser beam 28 and feeds it through filter 22 and amplifier 24 to drive modulator 26. Unmodulated laser beam 30 from station 12 enters modulator 26, is modulated in accordance with the signal contained in laser beam 28 and is retrodirected back to station 12 as laser beam 32. Laser beam 32 is detected and demodulated by the optical receiver at station 12. The optical receiver at station 10 is not used since that station is the transmitting station. The receiver would be used when station 10 is the receiving station.

Figure 5:
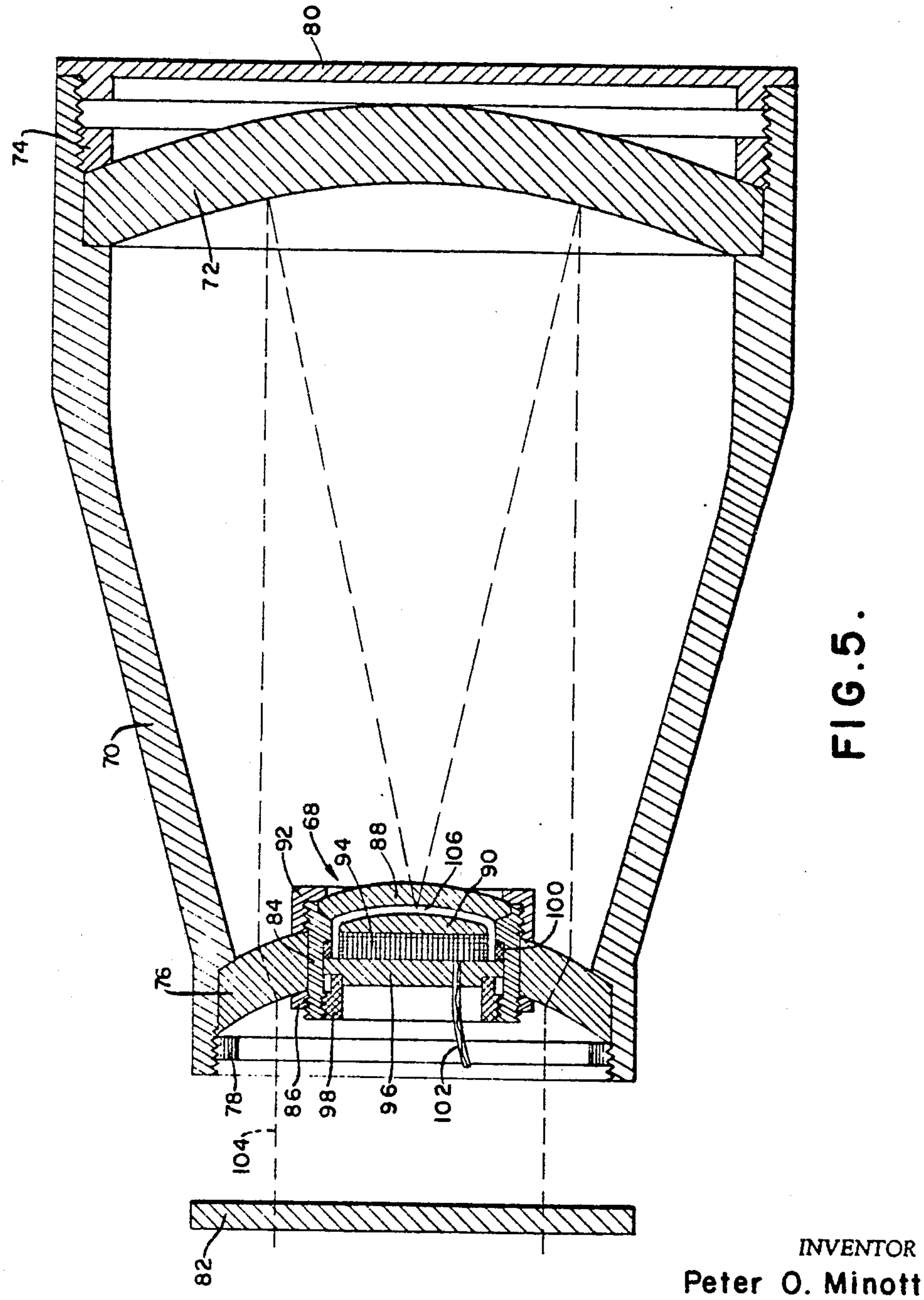
FIGURE 5 is a sectional view of the retrodirective optical modulator of the relay station of FIGURE 2.

Referring now to FIGURE 5, there is illustrated the retrodirective modulator 26 of relay station 14. Modulator 26 is essentially a single Bouwer's corrected concentric optical system having an interferometer modulating device mounted in the focal plane of the spherical primary mirror. To this end there is provided a generally conically shaped housing 70 having a spherical mirror 72 and a concentric corrector 76 rigidly fixed in the opposite ends thereof by annular holding rings 74 and 78, respectively. Cover plate 80 encloses the large end of housing 70 and provides protection for mirror 72. Concentric corrector 76 is provided to eliminate the spherical aberration of mirror 72. While most of the spherical aberration of mirror 72 can be eliminated by corrector 76, it has been found that by adding an aspheric corrector 82 the spherical aberration of mirror 72 can be corrected to the diffraction limit of the entrance pupil.

The modulating element of the retrodirective modulator 26 is a modified interferometer 68 mounted in the center of concentric corrector 72. Interferometer 68 comprises a housing 84 held in concentric corrector 76 by annular ring 86. The interferometer plates comprise beam splitter 88 and spherical mirror 90. Beam splitter 88, having its rear surface coated to reflect ⅓ and transmit ⅔ of the incident light, is held in a peripheral recess in housing 84 by annular ring 92. Spherical mirror 90 is secured to a piezoelectric ceramic or crystal 94 by a suitable bonding material. Ceramic or crystal 94 is secured to a backing plate 96 which is held in housing 84 by annular ring 98. The spacing between beam splitter 88 and mirror 90 can be roughly adjusted to within a few wavelengths of the desired distance by selection of a properly dimensioned cylindrical shim 100. A signal voltage may be supplied to crystal 94 via electrical leads 102. The interferometer plates 88 and 90 respectively, are located on opposite sides of the focal point of spherical mirror 72 for reasons which will be explained in greater detail later.

FIGURE 5 shows laser beam 104 which typically will have been generated by a receiving ground station. Laser beam 104 is shown passing through corrector lenses 82 and 76 impinging on spherical mirror 72, from which it is directed to its focal point 106. Interferometer 68, having its plates (beam splitter 88 and spherical mirror 90) located on opposite sides of focal point 106, operates to split light ray 104 into two coincident rays. This splitting operation occurs by the reflection of ⅓ of the light ray from beam splitter 88 and the reflection of the remaining ⅔ by spherical mirror 90. If the spacing between interferometer plates 88 and 90 has been set at one quarter of the wavelength of light ($\lambda/4$), the two coincident reflected light rays will be one-half wavelength ($\lambda/2$) out of phase and will destructively interfere with each other, causing the ray to be extinguished. However, if plates 88 and 90 are spaced one-half wavelength ($\lambda/2$) apart, then the two coincident reflected rays will be one wavelength ($\lambda$) out of phase and will constructively interfere, causing the ray to be reflected with no decrease in its intensity. Hence, it can be said that destructive interference will occur at $(2n+1)\lambda/4$ and constructive interference will occur at $(2n)\lambda/4$, where $n$ is any integer. Since crystal 94 can vary the spacing between interferometer plates 88 and 90 by at least one quarter wavelength ($\lambda/4$), the precise spacing between the interferometer plates is not critical provided that it is kept within a few wavelengths for reasons to be explained subsequently.

Figure 6:
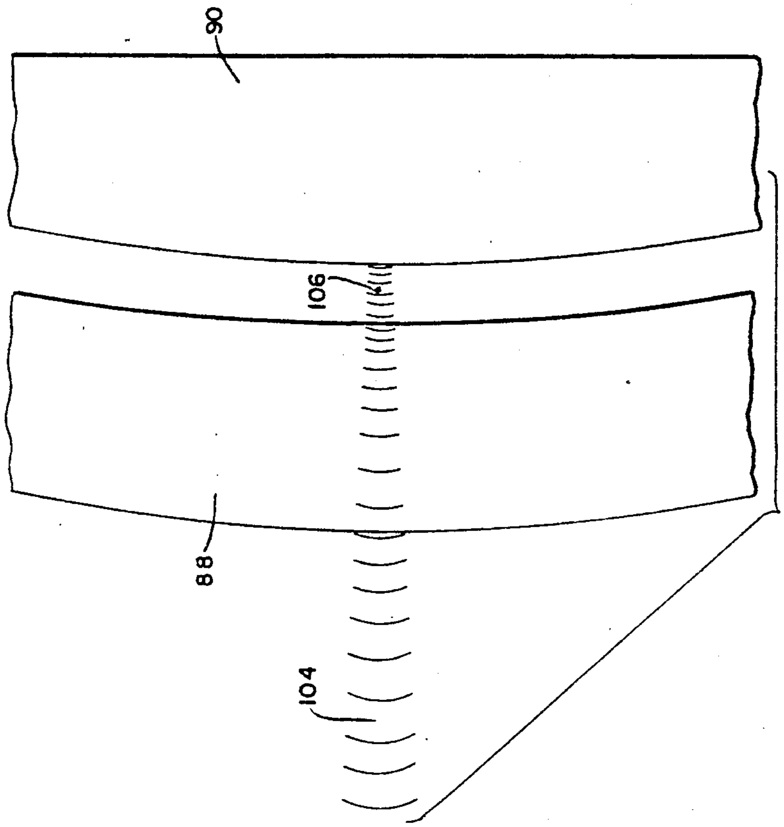
FIGURE 6 is an enlarged view of a portion of the interferometer of the retrodirective modulator shown in FIGURE 5.

Unlike prior art interferometers which operate with plane wavefronts, the modified interferometer 68 of the present invention operates with converging light waves or rays. An appreciation of this feature of the interferometer shown in FIGURE 5 may be obtained by an understanding of the theory of its operation which may be better understood by reference to FIGURE 6. Partial sections of beam splitter 88 and mirror 90 of interferometer 68 are illustrated in FIGURE 6 together with laser beam 104. Laser beam 104 is represented in wave form in FIGURE 6 so that its converging nature can be illustrated. The curvature of each of the waves has been exaggerated for purposes of illustration. The theoretical focal point of converging laser beam 104 is indicated at a point 106. Although conventional ray tracing would not indicate that interference patterns could be established with converging light, it was found that by placing the focal point of the converging light beam between interferometer plates 88 and 90 and keeping the spacing therebetween on the order of a few wavelengths that interference will in fact occur. The explanation of this phenomena lies in the fact that as converging light passes through its theoretical focal point, it changes from a curved to a plane wavefront. By keeping the curved interferometer plates sufficiently close together, with the theoretical focal point of the converging light between them, the interference takes place in approximately the same fashion as it does in a Fabry-Perot interferometer. Any spacing of the curved interferometer plates of approximately less than ten wavelengths will produce the desired interference.

Figure 7:
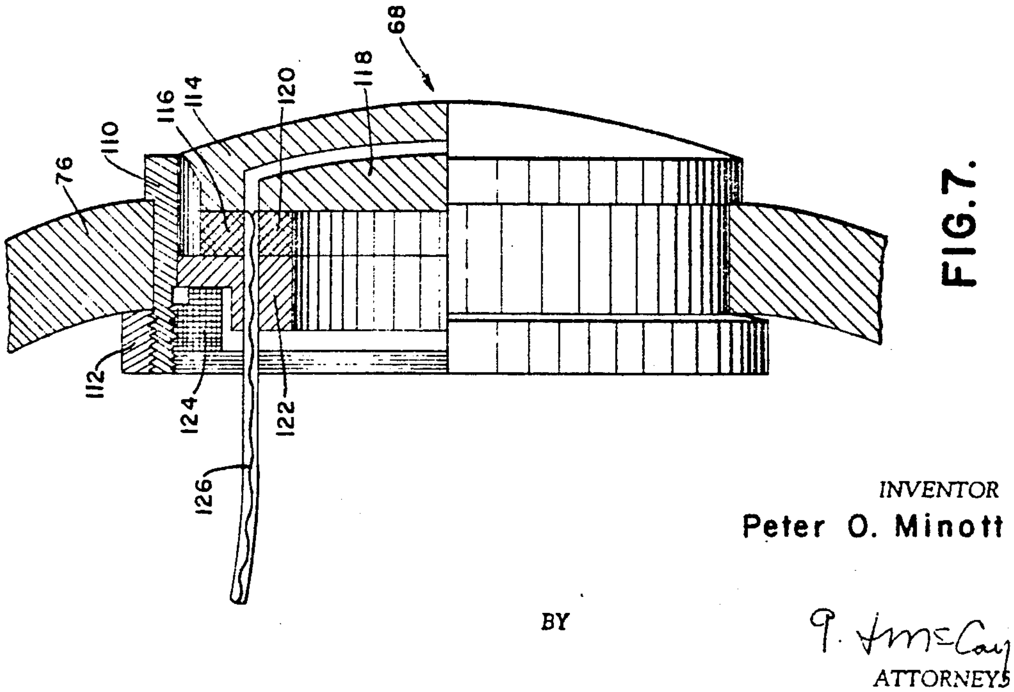
FIGURE 7 is a partial section of a modification of the interferometer modulating element of the retrodirective modulator of FIGURE 5.

Referring now to FIGURE 7, there is shown an alternate embodiment of the interferometer modulating device which requires only one-half of the power required by the interferometer modulating device shown in FIGURE 4. The interferometer modulating device, similar in most aspects to the device shown in FIGURE 5, comprises a housing 110 held in concentric corrector 76 by annular holding ring 112. Spherical beam splitter 114 is secured to a cylindrical piezoelectric crystal 116 and spherical mirror 118 is secured to a circular piezoelectric crystal 120. Both piezoelectric crystals 116 and 120 are mounted on backing plate 122 which is held in housing 110 by annular holding ring 124. Bias and signal voltages may be supplied to piezoelectric crystals via electrical lead 126. Since beam splitter 114 is secured to piezoelectric crystal 116, the annular lens holding ring 92 used to hold beam splitter 88 in FIGURE 5 is eliminated. The operation of the improved interferometer modulating device shown in FIGURE 7 is the same as the modulating device shown in FIGURE 5, with the obvious exception that the spacing between the interferometer plates is varied by the movement of both plates rather than only one.

The advantages of the alternate or push-pull embodiment of the interferometer modulating device of FIGURE 7 are several. For one, the use of two piezoelectric crystals in the manner shown greatly reduces the effects of heating of the crystals during operation of the modulating device. The reduction of heating during operation of the push-pull device is accomplished by the mounting of both interferometer plates on piezoelectric crystals so that both plates will be affected identically by thermal expansion and the spacing between plates will not vary. In addition, by mounting both interferometer plates on a common base, spacing variations due to changes in ambient temperature and aging of the crystal elements are eliminated. A final, but extremely important advantage of the improved modulating device, stems from the reduction in power required to drive the device. The power needed to drive a piezoelectric crystal is directly proportional to the square of the displacement. This can be restated to say the power needed to drive a given mass a given distance is four times that required to drive the same mass half the given distance. Therefore, the power required to drive the push-pull modulating device is one-half that required to drive a single crystal device.

The invention provides, therefore, an improved optical communications system using light modulating devices for long distance communications between two earth based stations via a synchronous orbit satellite. While specific embodiments have been described with particularity, it should be obvious to those skilled in the art that modifications and variations thereof may be resorted to. For example, the synchronous orbit satellite could be eliminated by providing a series of earth based stations so that each station would be in view of its adjacent stations. In addition, the novel interferometer modulating device could utilize an electromagnetic driving means rather than the piezoelectric means described. It is, therefore, to be understood that within the scope of the appended claims the invention may be practiced otherwise than as specifically set forth.

What is claimed is:

1. An optical communications system including in combination, a plurality of terminal stations, each said terminal station including first means for generating a light beam, second means for selectively modulating a light beam with an information signal, and third means for selectively detecting the information signal of a modulated light beam; a relay station located remote from said terminal stations, said relay station including light beam and an optical modulator, said optical modulator comprising retrodirective means for simultaneously modulating a light beam with an information signal and reflecting it in a direction parallel and opposite its original direction, so that the information signal of a modulated light beam from a first terminal station may be detected and impressed on an unmodulated light beam transmitted from and reflected to a second earth station and wherein said retrodirective means comprises a Bouwer's corrected concentric optical system having a primary mirror and having a concentric Fabry-Perot interferometer having a plurality of reflective surfaces, said interferometer being mounted in the focal plane of the primary mirror of said optical system so that the focal point of the primary mirror lies between the reflective surfaces of the interferometer.

2. An optical communications system including in combination, a plurality of terminal stations, each said terminal station including first means for generating a light beam, second means for selectively modulating a light beam with an information signal, and third means for selectively detecting the information signal of a modulator light beam; a relay including light beam and optical modulator means, said optical modulator comprising retrodirective means for simultaneously modulating a light beam responsive to an information signal and reflecting said light beam in a direction parallel and opposite its original direction, so that the information signal of a modulated light beam from a first terminal station may be detected and impressed on an unmodulated light beam transmitted from and reflected to a second terminal, wherein the retrodirective means further comprises, a spherical mirror having a focal point; an interferometer modulator positioned at the focal point of said spherical mirror so that a light beam directed towards said spherical mirror may be modulated and reflected away from the spherical mirror in a direction parallel and opposite to the original direction of the light beam.

3. An optical retrodirective modulator comprising:
- a spherical primary mirror;
- a beam splitting lens concentric with the primary mirror mounted between the primary mirror and its focal point for reflecting a portion of a light beam reflected by the primary mirror toward its focal point;
- a modulating mirror concentric with the primary mirror mounted more distant from the primary mirror than its focal point for reflecting the remainder of the light beam reflected by the primary mirror toward its focal point; and
- means for varying the spacing between said beam splitting lens and said modulating mirror so that the light beams reflected thereby are shifted one-half wavelength out of phase with respect to each other.

4. The optical retrodirective modulator of claim 3 further including a first corrector lens concentric with said primary mirror for correcting the spherical aberration of said primary mirror.

5. The optical retrodirective modulator of claim 4 further including an aspheric corrector lens for correcting, in combination with said concentric corrector lens, the spherical aberration of the primary mirror to the diffraction limits of said corrector lens.

6. Interferometric apparatus comprising:
- a spherical beam splitting lens for reflecting a portion of an incident light beam;

a spherical mirror concentric with and mounted adjacent said beam splitting lens for reflecting the remainder of said incident light beam; and means for varying the spacing between said beam splitting lens and said spherical mirror so that the reflected light beams may be varied one-half wavelength out of phase with each other.

7. The interferometric apparatus of claim 6 wherein said means for varying the spacing between said beam splitting lens and said spherical mirror includes electromechanical means attached to said spherical mirror.

8. The interferometric apparatus of claim 6 wherein the means for varying the spacing between said beam splitting lens and said spherical mirror includes:

a first electromechanical device attached to said beam splitting lens for moving said lens in a first direction, and a second electromechanical device attached to said spherical mirror for moving said mirror in a direction opposite to said first direction.

References Cited

UNITED STATES PATENTS

| | | | |
|---|---|---|---|
| 3,020,398 | 2/1962 | Hyde | 325—49 |
| 3,150,320 | 9/1964 | Gruenberg | 325—3 |
| 3,164,665 | 1/1965 | Stello | 350—160 |
| 3,215,842 | 11/1965 | Thomas | 250—199 |
| 3,224,330 | 12/1965 | Kompfner | 250—199 |
| 3,338,656 | 8/1967 | Astheimer | 350—161 |
| 3,348,058 | 10/1967 | Falbel | 350—160 |

FOREIGN PATENTS

| | | |
|---|---|---|
| 873,833 | 12/1957 | Great Britain. |

ROBERT L. GRIFFIN, *Primary Examiner.*

ALBERT J. MAYER, *Assistant Examiner.*

U.S. Cl. X.R.

88—14; 350—163